(12) United States Patent
Lin

(10) Patent No.: US 6,691,391 B2
(45) Date of Patent: Feb. 17, 2004

(54) CONCENTRIC ALIGNMENT ASSEMBLY DEVICE

(75) Inventor: Tung-Lung Lin, Banchiau (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/322,207

(22) Filed: Dec. 17, 2002

(65) Prior Publication Data

US 2003/0121166 A1 Jul. 3, 2003

(30) Foreign Application Priority Data

Dec. 28, 2001 (TW) .......................... 90223615 U

(51) Int. Cl.$^7$ .............................................. B25B 27/14
(52) U.S. Cl. ...................... 29/281.5; 29/251; 29/252
(58) Field of Search ................................ 29/281.5, 251, 29/252, 281.3; 100/49, 296.06

(56) References Cited

U.S. PATENT DOCUMENTS

| | | | | | |
|---|---|---|---|---|---|
| 3,052,955 A | * | 9/1962 | McAndrews | ............. | 29/898.07 |
| 5,495,660 A | * | 3/1996 | Choi | ............................. | 29/732 |
| 5,699,600 A | * | 12/1997 | Choi | ............................. | 29/251 |
| 5,758,408 A | * | 6/1998 | Choi | ............................. | 29/732 |
| 5,761,794 A | * | 6/1998 | Choi | ............................. | 29/732 |

* cited by examiner

Primary Examiner—Joseph J. Hail, III
Assistant Examiner—Daniel Shanley
(74) Attorney, Agent, or Firm—Ladas & Parry

(57) ABSTRACT

A concentric alignment assembly device for assembly of a first component and a second component. The concentric alignment assembly device includes a first base and a second base for receiving the first component and the second component. The first base has a pedestal and an adjusting portion, in which the adjusting portion is movably and rotatably coupled to the pedestal, and has a first platform for receiving the first component. The second base is provided on a side of the first base, and is movable within a fixed range and direction in relation to the first platform. When the second base moves toward the first base, the adjusting portion adjusts radial displacement and axial deviation of the first component in order to assemble the first component and the second component.

8 Claims, 5 Drawing Sheets

CONCENTRIC ALIGNMENT ASSEMBLY DEVICE

BACKGROUND OF THE INVENTION

1. Field of the Invention

The present invention relates to a concentric alignment assembly device for assembly of two fitting components, and particularly to a concentric alignment assembly device for assembly of a motor turntable of an optical drive spindle.

2. Description of the Related Art

Fitting quality is important to assembly components. For example, an optical drive requires good fitting of the motor turntable and the motor of its spindle in assembly in order to operate with stability. It goes without saying that inaccurate assembly of the motor turntable and the motor leads to instable operation of the optical drive.

It should be noted that fitting inaccuracy in assembly can be distributed to a radial displacement and an axial deviation. FIG. 1a and FIG. 1b show two cases in which two components are in assembly with different types of inaccuracy. In FIG. 1a, a protrusion component 110 is assembled to a cavity component 120, and the center line of the protrusion component 110 is parallel to the center line of the cavity component 120 by a distance of D. In this case, the radial displacement is D. Alternatively, in FIG. 1b, the center line of the protrusion component 110 and the center line of the cavity component 120 form an angle of θ. In this case, the axial deviation is θ. Consequently, it is necessary to simultaneously reduce the radial displacement and the axial deviation in order to obtain optimal assembly.

Generally, the radial displacement can be reduced by strict limitation of size tolerance of the components in fabrication. However, the axial deviation is determined mainly by the assembly-assisting device, such as a holding device or a fixture of the components, which creates difficulty in the elimination of axial deviation.

Conventionally, in the above-mentioned motor turntable and motor assembly, the motor turntable is placed in a base of a pressing machine, and the motor is disposed on a punch of the pressing machine to be visually aligned to the motor turntable. Then, the punch is pressed down toward the base, forcing the motor turntable and the motor to be assembled. In this case, however, it is not guaranteed that the motor and the motor turntable can be well aligned visually. Thus, the radial displacement and the axial deviation between the motor and the motor turntable occur, which leads to fitting inaccuracy and unfavorable pressing stress in both components.

SUMMARY OF THE INVENTION

In view of this, the present invention discloses a concentric alignment assembly device for assembly of two components, such as the above-mentioned motor and motor turntable. Thus, the concentric alignment assembly device performs concentric alignment in assembly for eliminating the radial displacement and the axial deviation, so that the two components is well-aligned, increasing the fitting accuracy and reducing the pressing stress in both of the components.

The present invention discloses a concentric alignment assembly device for assembly of a first component and a second component. The concentric alignment assembly device includes a first base and a second base for receiving the first component and the second component. The first base has a pedestal and an adjusting portion, in which the adjusting portion is movably and rotatably coupled to the pedestal, and has a first platform for receiving the first component. The second base is provided on a side of the first base, and is movable within a fixed range and direction in relation to the first platform. When the second base moves toward the first base, the adjusting portion adjusts radial displacement and axial deviation of the first component in order to assemble the first component and the second component.

In the present invention, the adjusting portion preferably includes a concentric adjusting device coupled to the first platform, and the concentric adjusting device is movable within a fixed range and direction in relation to the pedestal. Further, the concentric adjusting device may have a concentric ball bearing to adjust the radial displacement of the first component.

Meanwhile, the adjusting portion preferably includes an axial adjusting device being rotatable in relation to the pedestal. Further, the axial adjusting device may have a second platform, a ball rotatably connected between the second platform and the pedestal, and a plurality of cushion springs elastically connecting the second platform and the pedestal to adjust the axial deviation of the first component by the ball and the cushion springs.

Further, the second base preferably includes a block movable within a fixed range and direction in relation to the first platform, a spindle fixed to the block, a fixing portion coupled to the spindle by a linking structure so that the fixing portion fixes the second component, and a mandrel freely positioned with a gap between the spindle and the fixing portion, in which the mandrel is urged by the spindle and urges the second component against the first component for assembling the first component and the second component when the second base moves toward the first base.

The concentric alignment assembly device of the present invention can be utilized as a concentric alignment assembly fixture for assembly of a motor turntable of an optical disk spindle. That is, the first and second components can be respectively a motor and a motor turntable.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

Figure 1B:
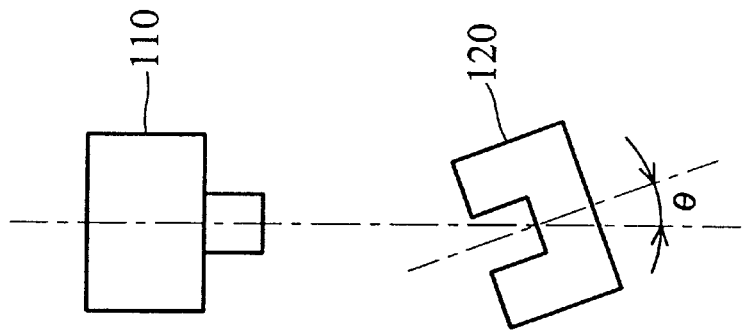
FIG. 1b is a scheme showing two components in assembly with an axial deviation.
Figure 1A:
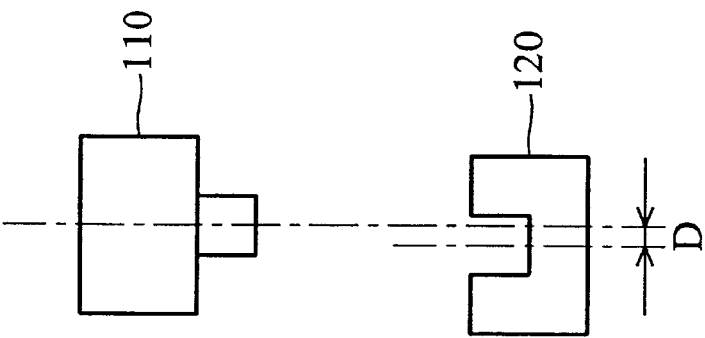
FIG. 1a is a scheme showing two components in assembly with a radial displacement.
Figure 2:
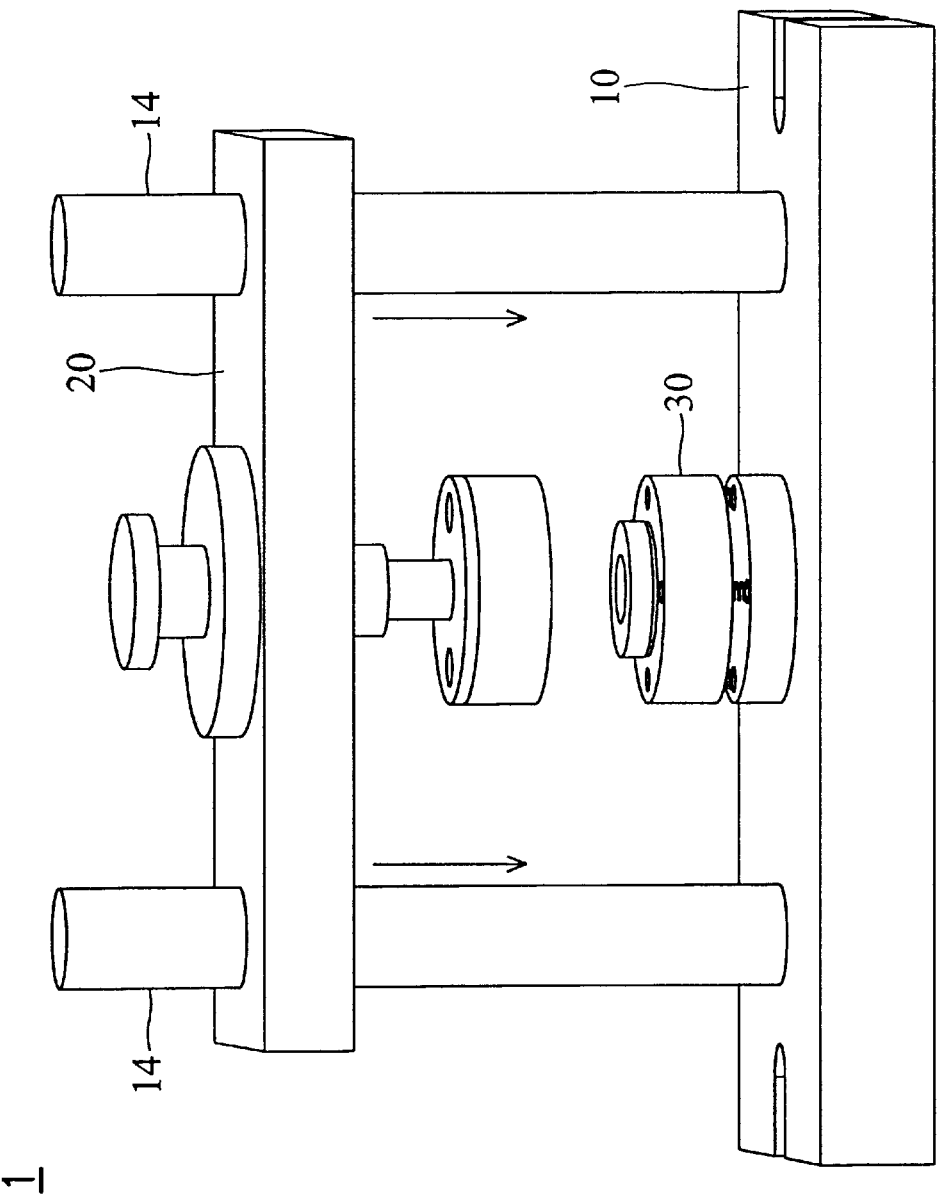
FIG. 2 is an assembly of an embodiment of the concentric alignment assembly device of the present invention.

An embodiment of the concentric alignment assembly device 1 of the present invention is described hereinafter in detail with reference to FIG. 2.

The concentric alignment assembly device 1 of the present invention is utilized for assembly of a first component and a second component. In the embodiment, the first component is a motor turntable, and the second component is a motor. Further, the concentric alignment assembly device 1 of the embodiment has a first base 10 and a second base 20.

Figure 3A:
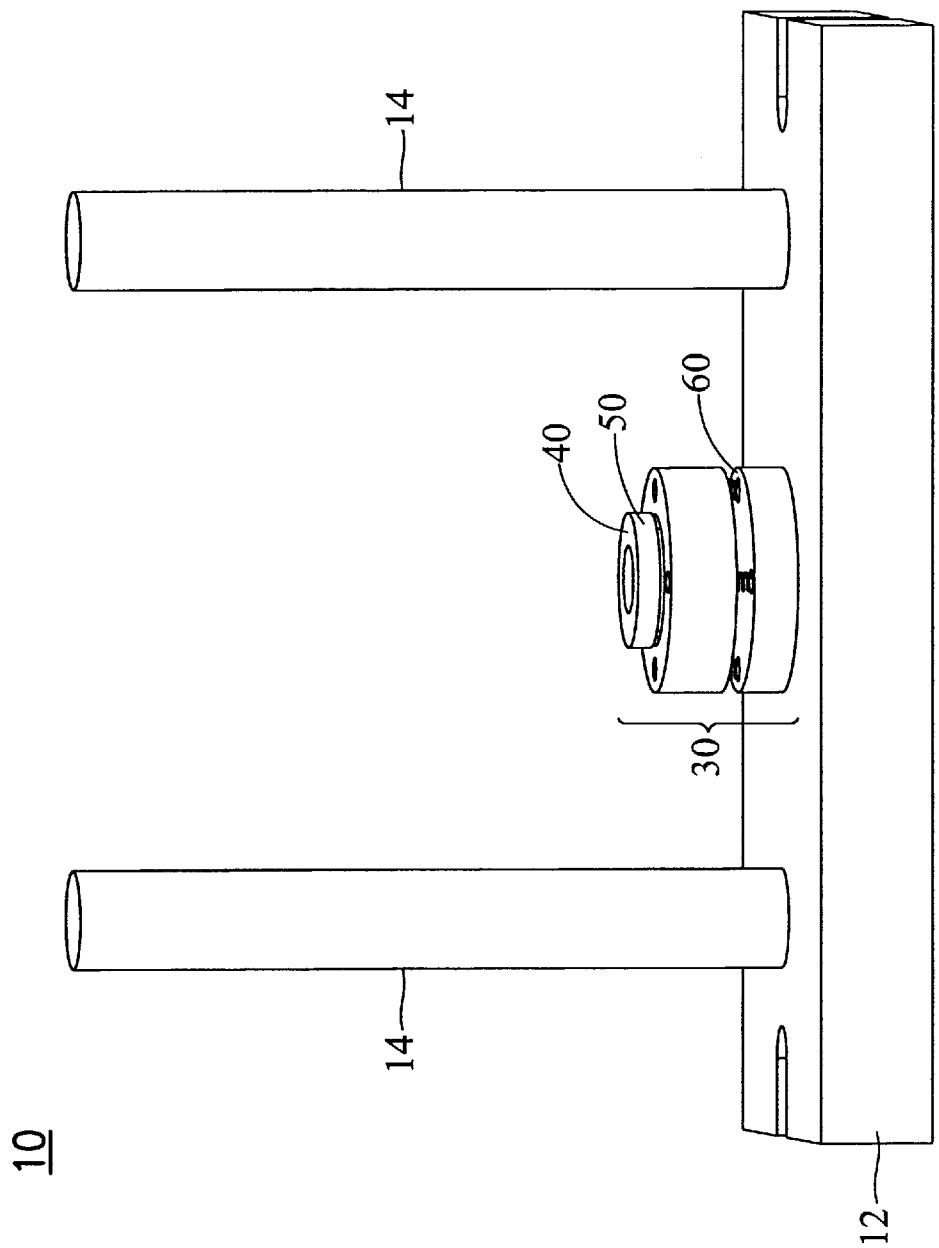
FIG. 3a is an assembly showing the first base of the embodiment.
Figure 3B:
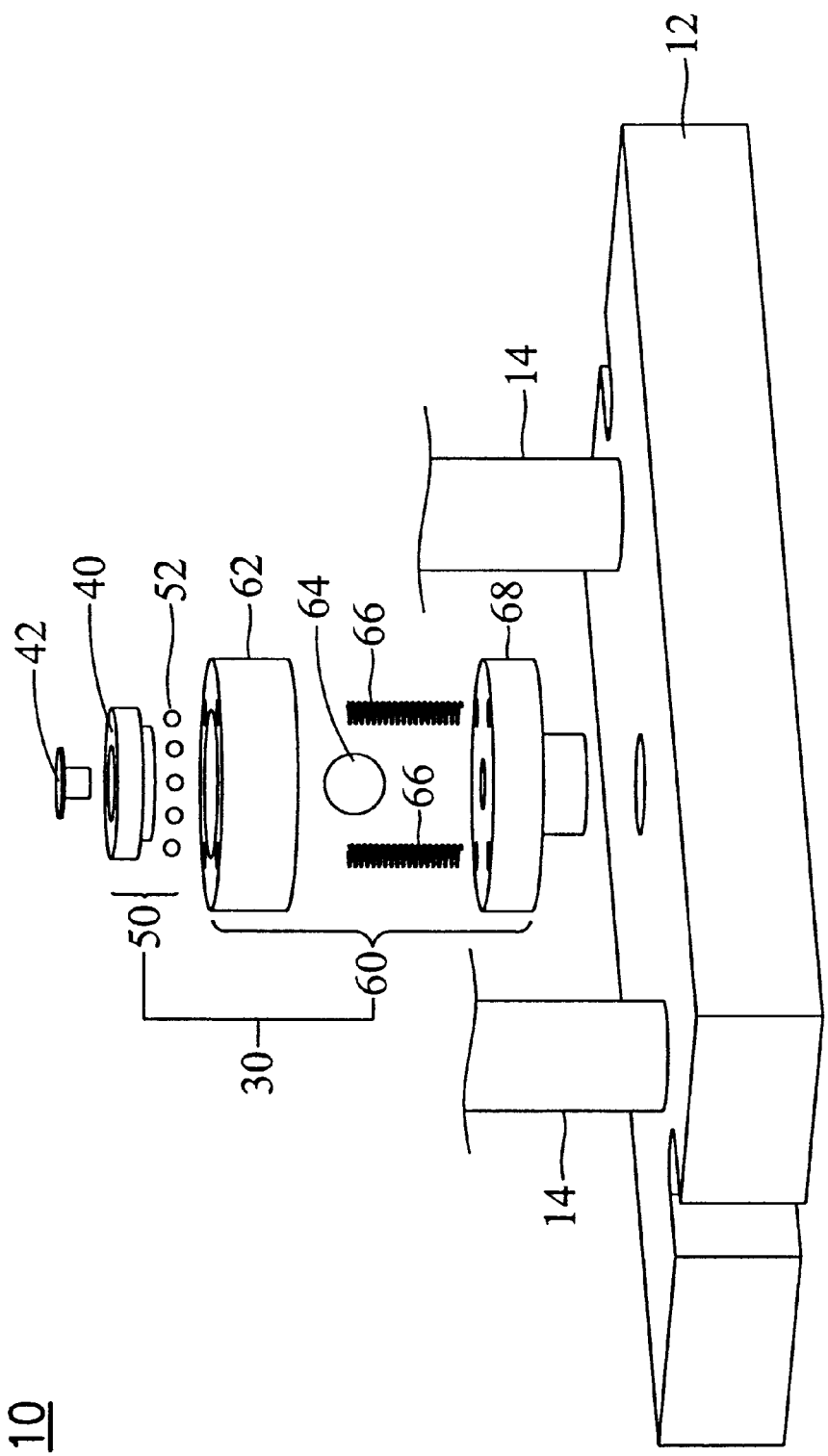
FIG. 3b is an disassembled view showing the first base of the embodiment.

The first base 10 of the embodiment is described in detail with reference to FIG. 3a and FIG. 3b. The first base 10 receives the motor turntable (that is, the first component). The first base 10 has a pedestal 12 and an adjusting portion 30, and is provided with two cylindrical sliding tracks 14. The adjusting portion 30 is movably and rotatably coupled to the pedestal 30, and has a first platform 40 for receiving the first component.

In the embodiment, the adjusting portion has a concentric adjusting device 50 and an axial adjusting device 60. The concentric adjusting device 50, such as a concentric ball bearing, is coupled to the first platform 40 and is movable within a fixed range and direction in relation to the pedestal 12 to adjust the radial displacement of the motor turntable (the first component). FIG. 3b shows the balls 52 of the concentric ball bearing of the concentric adjusting device 50. The concentric ball bearing has a plurality of balls 52 between a protrusion on the bottom of the first platform 40 and a concave on the second platform 62, and the concave has a distance to the protrusion that is slightly longer than diameter of the balls 52. In this case, the first platform 40 is movable within a fixed range and direction in relation to the second platform 62. Further, a pin 42 is preferably applied to connect the first platform 40 and the second platform 62 to prevent unfavorable disassembly.

Meanwhile, the axial adjusting device 60 is rotatable in relation to the pedestal 12, which has a second platform 62, a ball 64, and a plurality of cushion springs 66. The cushion springs 66 elastically connecting the second platform 62 and a supporting base 68 on the pedestal 12, and the ball 64 is rotatably provided between the second platform 62 and a concave on the supporting base 68. Thus, the second platform 62 is axially rotatable in relation to the pedestal 12 by the ball 64 and the elastically supported cushion springs 66 to adjust the axial deviation of the motor turntable (the first component). Further, the supporting base 68 is provided on the pedestal 12 with a protrusion on the bottom of the supporting base 68 fitting to a hole on the pedestal 12.

Figure 4:
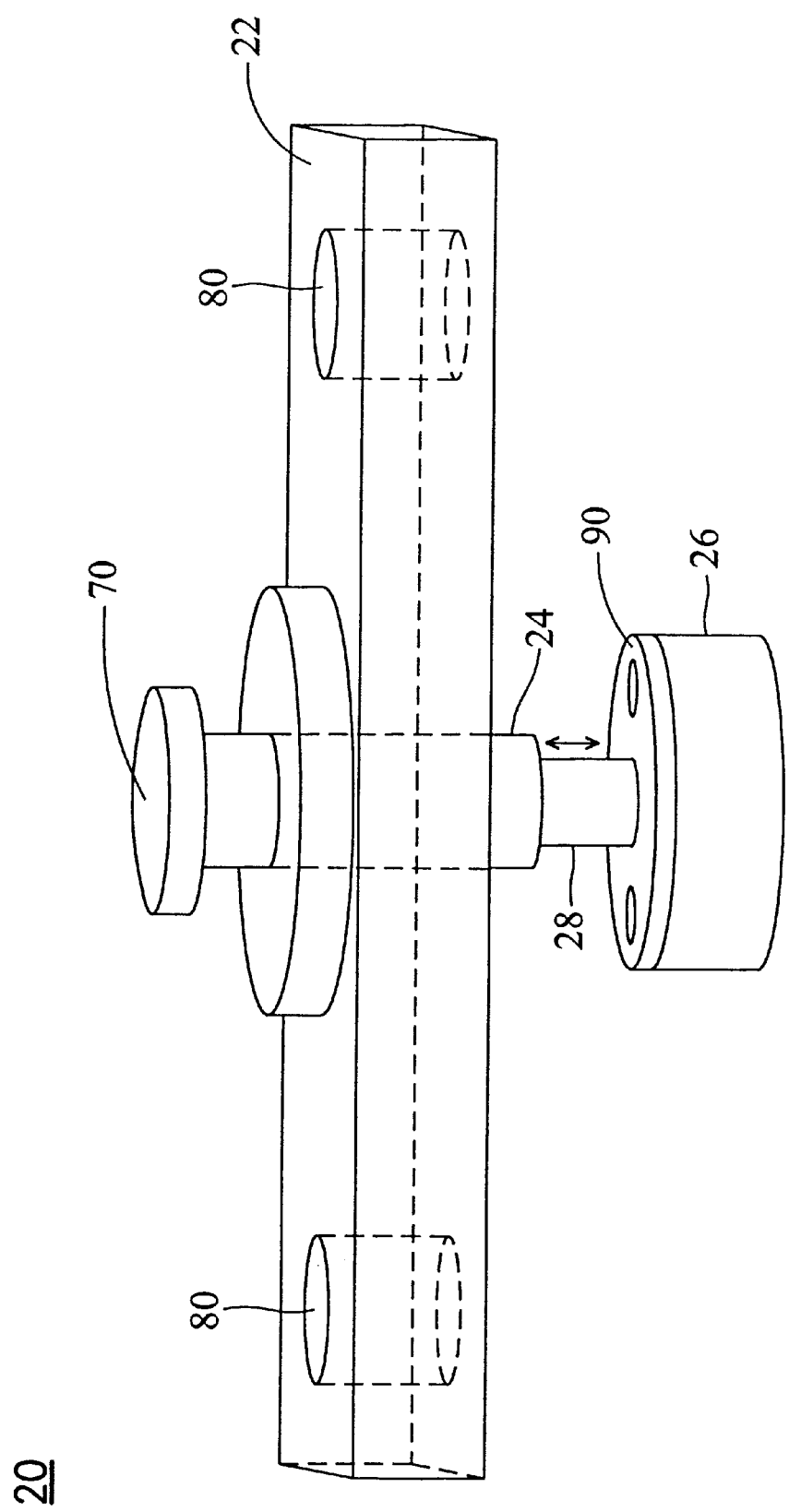
FIG. 4 is an assembly showing the second base of the embodiment.

Further, the second base 20 of the embodiment is described in detail with reference to FIG. 4. The second base 20 receives the motor (that is, the second component). The second base 20 is provided on the upper side of the first base 10, and is movable within a fixed range and direction in relation to the first platform 40 of the first base 10 with the sliding tracks 14. The second base 20 of the embodiment has a block 22, a spindle 24, a fixing portion 26, and a mandrel 28. Further, the second base 20 is provided with a clamping head 70 and two sliding holes 80 corresponding to the sliding tracks 14.

The block 22 is movable within a fixed range and direction in relation to the first platform 40. The spindle 24 is connected to the clamping head 70 and is fixed to the block 22, so that a pressing machine clamps the clamping head 70 in order to drive the block 22. The fixing portion 26 is coupled to the spindle 24 by a linking structure 90, such as a screwing structure, so that the fixing portion 26 fixes the motor (the second component). The mandrel 28 is freely positioned with a gap between the spindle 24 and the fixing portion 26. In this case, when the second base 20 moves toward the first base 10, the mandrel 28 is urged by the spindle 24 and urges the motor (the second component) against the motor turntable (the first component). Meanwhile, the adjusting portion 30 adjusts the radial displacement and the axial deviation of the motor turntable, so that the motor and the motor turntable are well assembled.

It should be noted that, in the embodiment, the motor turntable is placed on the first base 10 as the first component, and the motor is placed on the second base 20 as the second component. However, the concentric alignment assembly device of the present invention is not limited to the above-mentioned components. That is, the first and second components are alternatively exchangeable, and any other components that require concentric alignment in assembly are suited to the concentric alignment assembly device of the present invention.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A concentric alignment assembly device for assembly of a first component and a second component, the concentric alignment assembly device comprising:

a first base for receiving the first component, the first base comprising:

a pedestal;

an adjusting portion movably and rotatably coupled to the pedestal, the adjusting portion having a first platform for receiving the first component; and a second base for receiving the second component, the second base being provided on a side of the first base while being movable within a fixed range and direction in relation to the first platform;

wherein the first component and the second component are assembled by adjusting radial displacement and axial deviation of the first component with the adjusting portion when the second base moves toward the first base.

2. The concentric alignment assembly device according to claim 1, wherein the adjusting portion comprises:

a concentric adjusting device coupled to the first platform, the concentric adjusting device being movable within a fixed range and direction in relation to the pedestal.

3. The concentric alignment assembly device according to claim 2, wherein the concentric adjusting device further comprises a concentric ball bearing to adjust the radial displacement of the first component.

4. The concentric alignment assembly device according to claim 1, wherein the adjusting portion comprises:

an axial adjusting device being rotatable in relation to the pedestal.

5. The concentric alignment assembly device according to claim 4, wherein the axial adjusting device further comprises a second platform, a ball rotatably connected between the second platform and the pedestal, and a plurality of cushion springs elastically connecting the second platform and the pedestal to adjust the axial deviation of the first component by the ball and the cushion springs.

6. The concentric alignment assembly device according to claim 1, wherein the second base comprises:

a block movable within a fixed range and direction in relation to the first platform;

a spindle fixed to the block;

a fixing portion coupled to the spindle by a linking structure, the fixing portion fixing the second component; and a mandrel freely positioned with a gap between the spindle and the fixing portion, the mandrel being urged by the spindle and urging the second component against the first component for assembling the first component and the second component when the second base moves toward the first base.

7. The concentric alignment assembly device according to claim 1, wherein the first component is a motor turntable, and the second component is a motor.

8. The concentric alignment assembly device according to claim 1, wherein the first component is a motor, and the second component is a motor turntable.

* * * * *